United States Patent Office 3,644,550
Patented Feb. 22, 1972

3,644,550
SINGLE STAGE CYCLODIMERIZATION OF PARAFFINS TO AROMATIC COMPOUNDS
Harold Beuther, Gibsonia, John A. Ondrey, Springdale, and Harold E. Swift, Gibsonia, Pa., assignors to Gulf Research & Development Company, Pittsburgh, Pa.
No Drawing. Filed Apr. 21, 1969, Ser. No. 818,067
Int. Cl. C07c 5/26
U.S. Cl. 260—673    11 Claims

ABSTRACT OF THE DISCLOSURE

A method for the single stage dimerization of paraffins and mixtures of paraffins with olefins to aromatic compounds using a mixture of chromia-alumina and bismuth oxide. Isobutane and isobutane-isobutene mixtures are converted to p-xylene.

---

This invention relates to a novel process for converting paraffins and mixtures of paraffins and olefins to aromatic compounds and more particularly it relates to a novel process for converting paraffins and mixtures of paraffins and mono-olefins containing three or four carbon atoms into the corresponding six and eight carbon aromatic compounds, respectively.

Paraffins, particularly three and four carbon paraffins, are large volume products in refinery operations which are sold at very low cost, primarily for fuel. Olefins, particularly three and four carbon mono-olefins, are a large volume by-product of various other refinery operations. Since their combustion characteristics are generally undesirable, they cannot find a significant outlet in gaseous or LPG fuels. However, in view of their chemical reactivity these three and four carbon mono-olefins are generally utilized by upgrading by chemical reaction into chemical products of greater value than the starting olefins. Our process can upgrade these paraffins as well as mixtures of paraffins and these olefins by chemical reaction.

It is known that a three or four carbon paraffin can be converted in three stages into significant yields of aromatic compounds by dehydrogenating the paraffin at specific conditions over a suitable catalyst in a first stage, then dimerizing the resulting olefin at different conditions over a different catalyst in the second stage and then cyclizing the dimer by recycling it back to the first stage. Unexpectedly, we have discovered that these paraffins as well as mixtures of these paraffins and mono-olefins can be converted at excellent selectivity and good conversion to cyclic compounds in a single stage operation.

We have discovered that this single stage conversion can be accomplished by using a mixture of chromia-alumina and bismuth oxide as the catalyst. That this one-stage reaction takes place is highly surprising for a number of reasons. First, it is highly unexpected that the series of reactions taking place to convert the paraffin to the cyclic dimer occur at comparable rates at the same temperature. Second, it is known that hydrogen easily reduces bismuth oxide to bismuth metal and therefore it is very surprising that the hydrogen produced by the dehydrogenating and dehydrocyclizing reactions taking place has no apparent effect on the bismuth oxide. Third, chromia-alumina is known to be deactivated by water vapor, and therefore it is very surprising that the chromia-alumina is not affected by the water vapor produced in our one-stage process by the oxydehydrogenation reactions taking place. For example, we have demonstrated with an isobutane feed in a three-stage operation using chromia-alumina in the first stage, bismuth oxide in the second stage and chromia-alumina in the third stage that the bismuth oxide is reduced in the second stage by the hydrogen produced in the first stage, and the chromia-alumina in the third stage is substantially deactivated by the water produced in the second stage reaction involving the bismuth oxide. Yet when the bismuth oxide and chromia-alumina are mixed and the reaction is undertaken in one stage in accordance with our invention, the chromia-alumina is not significantly affected by the water vapor and the bismuth-oxide is not significantly affected by the hydrogen both of which are shown to be present by analysis of the product stream.

This invention is particularly suitable for converting propane, n-butane and isobutane and mixtures of these with propylene, 1-butene, 2-butene and isobutene to higher molecular weight cyclic dimers particularly the aromatic dimers. The primary product of the propane and the mixed propane-propylene reaction is benzene and that of the isobutane and mixed isobutane-isobutene feed is p-xylene. N-butane and the 1-butene and/or 2-butene mixture react very similarly producing a mixture of cyclic compounds primarily 4-vinylcyclohexene-1, styrene and xylenes as the primary product. A mixture of the specified paraffins and olefins produces a relatively large mixture of compounds and for this reason is less desirable than a pure paraffin alone or the paraffin mixed with its corresponding mono-olefin.

The overall, single-stage conversion process of our invention probably includes the following specific, sequentially occurring and/or competitive reactions, that is, dehydrogenation, oxydehydrogenation, dehydrodimerization, isomerization, oxydehydrodimerization, dehydrocyclization as well as others. Evidence indicates that there is a significant difference in the degree each specific reaction contributes to the overall reaction depending on the catalyst bed configuration, that is, whether a randomly dispersed mixture of bismuth oxide and chromia-alumina or a sequential chromia-alumina to bismuth oxide to chromia-alumina configuration is used. This is indicated in part by a marked increase in selectivity to cyclic products using the random catalyst bed compared to the sequential configuration.

An inert diluent gas such as nitrogen, methane, ethane, helium, argon, etc. can be added to the feed stream to control the overall reaction. By adding an inert gas to the feed at otherwise constant conditions less per pass conversion of the feed occurs and this tends to stabilize the bismuth oxide against reduction to the free bismuth metal. Furthermore, the addition of the inert gas has a tendency to reduce the formation of carbon oxides and decreases the dealkylation of the alkyl groups in the cyclic product. However, this increase of inert diluent tends to decrease the selectivity of the reaction to the cyclic compounds in favor of linear diolefins. The amount of inert diluent that is useful generally ranges from 0 to about 80 volume percent of the feed stream. It is preferred, however, not to exceed 50 percent inert diluent in the feed stream.

We have determined that a temperature of at least about 475° C. is required for a significant conversion of the feed to the cyclic dimers in our process. As the temperature is increased, the conversion increases until at about 575° C. the reaction starts to become unselective. Also at the higher temperatures there is a tendency to overreduce the bismuth oxide to free bismuth metal. Above 625° C. the reaction to undesired products becomes so significant that operation at this high temperature is undesirable. Thus we have determined that a broad operating range is about 475° to about 625° C. with a preferred range of 525° to 575° C. for desirable conversion with a minimum of degradation products. The preferred temperature is about 550° C. Since a temperature gradient tends to form in the catalyst bed, the operating temperature as described herein is the maximum temperature occurring in the catalyst bed.

The bismuth oxide reactant is conveniently prepared by the thermal decomposition of a suitable bismuth compound, that is a compound that thermally decomposes to bismuth oxide such as bismuth nitrate, bismuth carbonate, bismuth hydroxide, bismuth acetate, etc. The bismuth compound is formed into suitably sized particles such as 10 to 20 mesh size up to ⅜ inch pellets or larger and calcined in air. The surface area of the resulting material is generally relatively low, that is about 0.1 to about 10 square meters per gram. Other metal oxides, such as zinc oxide, magnesia, calcium oxide, titanium dioxide and the like, can be incorporated in the bismuth oxide for the purpose of aiding in its formation, reducing physical attrition and increasing the stability of the bismuth oxide towards reduction. In the reaction taking place oxygen is extracted from the crystal lattice of the bismuth oxide. This bismuth oxide is capable of losing a substantial amount of its oxygen (approximately 60 percent) without damage to its lattice structure and it can be regenerated by heating in air. The regeneration of the bismuth oxide should take place before excess oxygen is removed from the crystal lattice to prevent a collapsing of the crystal lattice structure and a coalescing of bismuth metal.

The chromia-alumina catalyst used in the process can be any chromia-alumina material, preferably of conventional manufacture and composition. For example, preformed alumina particles can be treated with a suitable solution of a chromium compound and the resulting impregnated particles pelleted, dried and calcined to produce the resulting chromia-alumina material. We find that chromia-alumina compositions containing from about five to about 50 mol percent chromia are satisfactory with the preferred chromia-alumina compositions containing from about 10 to about 25 mol percent chromia. The chromia-alumina composition may be promoted with a conventional promoter material such as potassium, sodium, silicon, etc., in an amount up to about three to five percent calculated as the oxide. It is preferred that the particle size of the chromia-alumina be similar to that of the bismuth oxide. If the particles size of either constituent is too small, an undesirably large pressure drop across the catalyst bed may result. The finished catalyst can be prepared conveniently by randomly mixing the chromia-alumina with the bismuth oxide. Also, an inert material such as silicon carbide, alpha alumina, zirconium oxide, etc. can be mixed with the catalyst to serve as a dispersant or a diluent. This inert material, when used, is preferably of a particle size similar to the other constituents.

The relative amount of chromia-alumina and bismuth oxide is a factor affecting the course of the reaction. We find that above five to about 50 weight percent chromia-alumina with the remainder bismuth oxide in the active portion of the catalyst is satisfactory with a ratio of about 10 to 30 weight percent being preferred and about 20 to 25 weight percent the most preferred composition. When the ratio of chromia-alumina goes below five weight percent, the primary products are the linear diolefins with only minor amounts of the cyclic compounds. As the amount of chromina-alumina goes above about 50 weight percent, coking, cracking and polymerization become excessive. The large amount of hydrogen formed under these conditions has a tendency to reduce the bismuth to free bismuth metal. Thus with a high ratio of chromia-alumina to bismuth oxide a lower reaction temperature may be desirable with an inert diluent in the feed.

We find that moderate pressures are the most desirable for the reaction. Thus we find that a pressure from about one atmosphere to about 150 p.s.i.g. is satisfactory although we prefer a pressure from about one atmosphere to about 25 p.s.i.g. The reaction can be conducted at subatmospheric pressure but there is no particular advantage in undertaking this additional expense. Above about 50 p.s.i.g. underisable side reactions forming coke and polymer with concurrent excess reduction of the bismuth oxide to free bismuth metal tends to occur. This tendency can in part be compensated for by temperature control and use of an inert diluent.

The space time, that is, the reciprocal of the gas hourly space velocity is a factor in establishing the general course of the reaction. If the space time is too long, there is a tendency to form coke, polymers and crack the starting material and products. Also, at long space times the tendency to reduce bismuth oxide to free metal increases. If the space time is too short, there is a significant decrease in the conversion of the feed with a lowered selectivity to the cyclic products. For these reasons we prefer to use a space time of about four to about 50 seconds with a more preferred space time of about 10 to about 35 seconds with about 18 to about 30 seconds most preferred, all ranges specified in terms of the hydrocarbon feed and the catalytic material.

After the reaction has proceeded for such time that the bismuth oxide has lost a significant amount of its lattice oxygen but prior to damage of the lattice structure the bismuth oxide is regenerated by reoxidizing it with a suitable oxidizing gas such as pure oxygen or air. Therefore, the reaction can be carried out in a cyclic operation with reaction in one cycle and regeneration in a second cycle. For continuous operation it is desirable to have two reactors such that a continuous stream of reacting gas flows through one of two reactors while the second one is regenerated. The cycle is periodically reversed. In order to obtain the best benefits from this invention, it is desiable to separate the unreacted paraffin and olefin from the product stream and recycle them to the feed stream.

We now describe by way of specific examples the use of our invention, however, these examples are not to be construed in any manner as limiting our invention.

EXAMPLE 1

A reactor constructed of 20 mm. ID quartz tubing, 42 cm. in length was used for these experiments. The reactor was heated by means of a tube furnace and a six-point multicouple was placed in a 5 mm. OD thermowell extending the length of the catalyst zone. The catalyst was held in place by means of a quartz wool support. Silicon carbide was placed above the catalyst zone to serve as a preheat section and as a gas mixer.

A catalyst mixture was made up by mixing 21.0 g. of 10 to 20 mesh $Bi_2O_3$ and 5.1 g. of 10 to 20 mesh chromia-alumina and the mixture was placed in the reactor. The chromia-alumina contained 19.8 percent chromia and was doped with a 0.28 percent sodium. A series of runs were made at different temperatures. Prior to each run the reactor was preheated in air for one hour to the desired temperature. A stream of 20 volume percent isobutene in isobutane was then passed through the reactor at a space time of 18 seconds at the desired temperature and a run time of one-half hour. The conversion in mol percent of isobutane, the selectivity to six to eight carbon materials and the weight percent of the six to eight carbon products is set forth in Table I.

TABLE I

| Run | 1 | 2 | 3 | 4 |
|---|---|---|---|---|
| Reaction temperature, °C | 500 | 530 | 550 | 585 |
| Isobutane conversion | 2.8 | 5.6 | 12.0 | 13.0 |
| Selectivity, $C_6$ to $C_8$ | | 77 | 75 | 75 |
| $C_6$ to $C_8$ products, wt. percent: | | | | |
| Diisobutylene | | 1.5 | 2.0 | 2.2 |
| 2,5-dimethyl-1,5-hexadiene | | 11.9 | 12.1 | 11.2 |
| 2,5-dimethyl-2,4-hexadiene | | 7.7 | 5.6 | 5.1 |
| Benzene | | | 1.0 | 1.3 |
| Toluene | | 2.1 | 4.8 | 5.9 |
| Xylenes (98% para) | | 76.8 | 74.5 | 74.3 |

EXAMPLE 2

Example 1 was repeated except that the temperature of reaction was maintained at 550° C. and the space time of the feed stream with the catalyst was varied over a series of runs. The conversion in mol percent of isobutane, the selectivity to six to eight carbon materials and the weight percent of the six to eight carbon products are set forth in Table II.

TABLE II

| Run | 5 | 6 | 7 | 8 | 9 |
|---|---|---|---|---|---|
| Space time, sec | 30.0 | 22.5 | 18.0 | 11.5 | 8.0 |
| Isobutane conversion | 15.2 | 13.2 | 12.0 | 6.1 | 4.6 |
| Selectivity, $C_6$ to $C_8$ | 73 | 74 | 75 | 79 | 81 |
| $C_6$ to $C_8$ products, wt. percent: | | | | | |
| Diisobutylene | 1.8 | 2.0 | 2.0 | 1.6 | 1.4 |
| 2,5-dimethyl-1,5-hexadiene | 9.7 | 10.4 | 12.1 | 13.3 | 15.6 |
| 2,5-dimethyl-2,4-hexadiene | 5.0 | 5.3 | 5.7 | 6.9 | 7.6 |
| Benzene | 1.2 | 1.5 | 1.0 | 0.8 | 0.7 |
| Toluene | 5.0 | 5.2 | 4.7 | 4.0 | 3.2 |
| Xylenes (98% para) | 77.3 | 75.6 | 74.5 | 73.4 | 71.5 |

EXAMPLE 3

Example 1 was repeated except that the temperature of reaction was maintained at 550° C. and the weight percent chromia-alumina in the catalyst mixture was varied over a series of runs. The conversion in mol percent of isobutane, the selectivity to six to eight carbon materials and the distribution of the products in the six to eight carbon fraction are set forth in Table III.

TABLE III

| Run | 10 | 11 | 12 | 13 |
|---|---|---|---|---|
| $Cr_2O_3$—$Al_2O_3$, wt. percent | 13 | 17.3 | 22.0 | 26.0 |
| Isobutane conversion | 8.0 | 10.8 | 12.0 | 11.6 |
| Selectivity $C_6$ to $C_8$ | 72 | 76 | 75 | 75 |
| $C_6$ to $C_8$ products, wt. percent: | | | | |
| Diisobutylene | 3.0 | 2.2 | 2.0 | 1.7 |
| 2,5-dimethyl-1,5-hexadiene | 7.9 | 8.0 | 12.1 | 6.7 |
| 2,5-dimethyl-2,4-hexadiene | 9.7 | 6.9 | 5.7 | 5.6 |
| Benzene | 1.6 | 1.2 | 1.0 | 1.4 |
| Toluene | 4.6 | 4.5 | 4.7 | 5.3 |
| Xylenes (98% para) | 73.2 | 77.2 | 74.5 | 79.8 |

EXAMPLE 4

A catalyst was made up by mixing 10 cc. of bismuth oxide, stabilized with 10 weight percent zinc oxide, with 6 cc. of chromia-alumina. The chromina-alumina contained 12.0 percent chromia, 4.0 percent silica, 2.0 percent $K_2O$ and the remainder eta alumina. The catalyst was heated to 550° C. in air for one-half hour and then 40 cc./min. isobutane and 10 cc./min. isobutene were passed through the catalyst for one-half hour. A 20 percent conversion of isobutane resulted with a selectivity of 70 percent to the six to eight carbon products. This fraction analyzed 78.8 percent xylenes (98% para), 4.4 percent toluene, 3.1 percent benzene, 5.2 percent 2,5-dimethyl-2,4-hexadiene, 6.4 percent 2,5-dimethyl-1,5-hexadiene and 2.1 percent diisobutylene. The zinc oxide significantly hardened the bismuth oxide making it much more resistant to physical breakdown and reduced catalyst sintering thereby keeping activity at a high level. Other oxides such as niobia, zirconia, etc., can be used for this purpose.

EXAMPLE 5

Two reactors connected in parallel operate cyclically at 550° C. for one-half hour in reaction and one-half hour in regeneration. The catalyst in each reactor is 22 weight percent chromia-alumina mixed with bismuth oxide. A recycle stream consisting of 31 mol percent isobutene and 69 percent isobutane is mixed with sufficient makeup isobutane from an external source to produce a 20 mol percent isobutene feed to the reactor haveing a gas hourly space velocity of 300. The exhaust stream is cooled to 0° C. and water is extracted. The conversion of isobutane is nine percent with the organic condensate containing 2.0 weight percent diisobutylene, 12.1 percent 2,5-dimethyl-1,5-hexadiene, 1.0 percent benzene, 5.6 percent 2,5-dimethyl-2,4-hexadiene, 4.8 percent toluene, and 74.5 percent xylenes (98% para). The noncondensed material analyzes as 28 volume percent isobutene, 62 percent isobutane, 9 percent carbon dioxide and 1 percent hydrogen. Air is used in the regeneration of the catalyst.

In like manner propane and mixtures of propane and propylene produce benzene. Also n-butane and mixtures of n-butane with butene-1 or butene-2 produce a mixture of 4-vinylcyclohexene-1, styrene, ethylbenzene, mixed xylenes and toluene.

This process is particularly suitable for upgrading a saturated paraffin, such as n-butane, which is frequently a byproduct in substantial excess in normal refinery operation. For example, the n-butane can be readily isomerized to isobutane and fed to a reactor such as described herein. With recycle of unreacted isobutane and isobutene the isobutane is converted almost completely to useful organic dimers, particularly p-xylene, except for that minor amount which is degraded to carbon dioxide.

Additionally a mixed plant stream can be used for the feed such as an isobutane-isobutene or a propane-propylene mixture. In either case the recycle stream will also be a mixture of the same constituents as the makeup stream but of different composition. The feed stream to the reactor, after the recycle stream is added to the makeup stream, can vary in composition from about 5 to about 85 mol percent of the olefin, however, it is more preferred to use a feed stream directly to the reactor having an olefin content of between about 10 and 40 percent and most preferably 20 to 30 percent.

If the olefin content of the feed to the reactor exceeds 30 percent at an operating temperature of 550° C. or higher, the catalyst tends to become overreduced to an inactive state, the yield decreases and the amount of cracked product increases. If the reaction temperature is significantly reduced or the partial pressure reduced with an inert diluent in order to overcome these problems, the yield of desired products significantly decreases. Therefore, the preferred operation is to use an optimum ratio of paraffin to olefin at an optimum temperature with no inert diluent. In the mixed gas stream proper dilution of the olefin with the paraffin tends to provide an olefin partial pressure for optimum reaction.

An operation where n-butane is isomerized to isobutane which is then mixed with a recycle stream and converted to p-xylene according to our process is overall a method of converting n-butane to p-xylene. However, the actual feed stream that is reacted in accordance with our invention is an isobutane-isobutene mixture. Since it is unlikely that our process would be used for commercial purposes without recycle, commercial operation involves a mixed paraffin-olefin feed stream directly to the reactor even though the raw material available from the plant may be substantially pure paraffin.

It is to be understood that the above disclosure is by way of specific example and that numerous modifications and variations are available to those of ordinary skill in the art without departing from the true spirit and scope of the invention.

We claim:

1. The process which comprises cyclodimerizing propane, n-butane, isobutane or mixtures thereof at a temperature between about 425° C. and 625° C. by reaction with the oxygen of bismuth oxide in the presence of a catalyst comprising chromia-alumina, said bismuth oxide reactant and said chromia-alumina catalyst being present as a mixture comprising particles of bismuth oxide and separate particles of chromia-alumina, the weight ratio of bismuth oxide particles to chromia-alumina particles being between about 19 to 1 and about 1 to 1, and recovering a liquid product comprising at least one aromatic compound which is the cyclized dimer of the feed material as the major product.

2. A process in accordance with claim 1 in which unreacted propane, n-butane or isobutane and any propylene, 1-butene, 2-butene or isobutene that are present in the product are separated from the product stream and recycled for admixture with said feed propane, n-butane or isobutane.

3. A process in accordance with claim 2 in which the chromia-alumina content is from about 5 to about 50 weight percent of the total amount of chromia-alumina and bismuth oxide.

4. A process in accordance with claim 3 in which said chromia-alumina content is between about 10 and about 30 weight percent.

5. A process in accordance with claim 4 in which the temperature is between about 525° C. and about 575° C.

6. A process in accordance with claim 5 in which propane and propylene are fed to the reactor and benzene is the major product.

7. A process in accordance with claim 6 in which the propylene content is from about 10 to about 40 mol percent of the total amount of propylene and propane.

8. A process in accordance with claim 7 in which said propylene content is between about 20 and about 30 mol percent.

9. A process in accordance with claim 5 in which a mixture of isobutane and isobutene are fed to the reactor and p-xylene is the major product.

10. A process in accordance with claim 9 in which the isobutane content is from about 10 to about 40 mol percent of the total amount of isobutane and isobutene.

11. A process in accordance with claim 10 in which said isobutene content is between about 20 and about 30 mol percent.

References Cited

UNITED STATES PATENTS

| 2,378,209 | 6/1945 | Fuller et al. | 260—673.5 |
| 2,754,345 | 7/1956 | Kirshenbaum | 260—673.5 |
| 3,027,413 | 3/1962 | Moy et al. | 260—672 |
| 3,374,281 | 3/1968 | Csicsery | 260—673 |

DELBERT E. GANTZ, Primary Examiner

J. M. NELSON, Assistant Examiner

UNITED STATES PATENT OFFICE
CERTIFICATE OF CORRECTION

Patent No. 3,644,550     Dated February 22, 1972

Inventor(s) Harold Beuther, et al

It is certified that error appears in the above-identified patent and that said Letters Patent are hereby corrected as shown below:

Column 2, line 65, "Above 625°C." should read -- Above about 625° C. -- . Column 3, line 42, "particles" should read -- particle -- ; line 62, "chromina-alumina" should read -- chromia-alumina -- ; line 65, "bismuth to" should read -- bismuth oxide to -- . Column 4, line 1, "underisable" should read -- undesirable -- ; line 32, "desiable" should read -- desirable -- . Column 5, line 64, "haveing" should read -- having -- . Column 6, line 8, "tion. For" should read -- tions. For -- .

Signed and sealed this 14th day of November 1972.

(SEAL)
Attest:

EDWARD M. FLETCHER, JR.        ROBERT GOTTSCHALK
Attesting Officer               Commissioner of Patents